Feb. 18, 1964 S. A. BORDELON, JR 3,121,787

DIGITAL COMPUTER APPARATUS

Filed Dec. 12, 1960 2 Sheets-Sheet 1

INVENTOR
SIDNEY A. BORDELON JR.,
BY Robert H. Himes
ATTORNEY.

Feb. 18, 1964 S. A. BORDELON, JR 3,121,787

DIGITAL COMPUTER APPARATUS

Filed Dec. 12, 1960 2 Sheets-Sheet 2

INVENTOR.
SIDNEY A. BORDELON, JR.
BY
Robert H. Himes
ATTORNEY

United States Patent Office 3,121,787

Patented Feb. 18, 1964

3,121,787

DIGITAL COMPUTER APPARATUS

Sidney A. Bordelon, Jr., Anaheim, Calif., assignor to Hughes Aircraft Company, Culver City, Calif., a corporation of Delaware Filed Dec. 12, 1960, Ser. No. 75,443
1 Claim. (Cl. 235—92)

Figure 1:
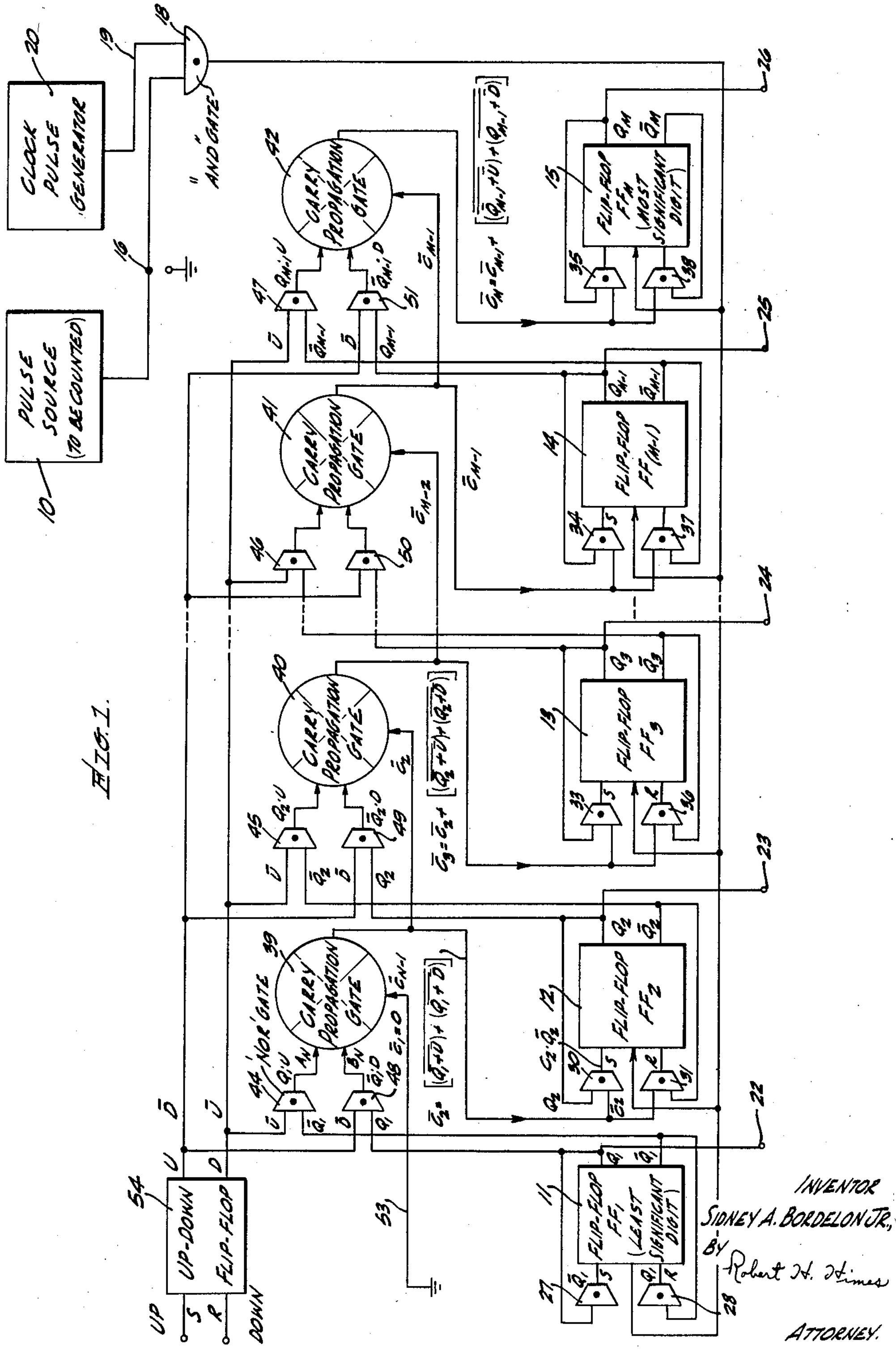

This invention relates to a digital computer counting apparatus and, more particularly, to a high-speed digital computer counting apparatus exceeding 12 bits and incorporating novel fast-acting carry propagation gates.

In conventional binary counter apparatuses, the inputs of those flip-flops incorporated therein which correspond to the more significant digits are dependent upon outputs from all the flip-flops corresponding to the less significant digits. There are two principal ways to implement this type of counter. In a first way, each flip-flop of the counter is designed to be capable of driving all succeeding flip-flops corresponding to the more significant digits. Thus, in a 14-bit counter, the flip-flop corresponding to the least significant digit must be capable of driving all of the succeeding 13 flip-flops. In the case of most general flip-flops, this capability is very unlikely in that a typical general purpose flip-flop can under normal conditions drive only 6 flip-flops or 12 NOR gates.

A second possibility is to employ NOR gates to regenerate the more heavily loaded flip-flop output signals. Two alternatives are possible when employing NOR gates for this purpose. One alternative is to minimize total delay which the NOR gates introduce during regeneration, and the other alternative is to minimize the total number of NOR gates needed to provide the minimum amount of regeneration. In general, it is sufficient to say that the known techniques employed to minimize delay all require a large number of NOR gates. On the other hand, when a technique to minimize the number of NOR gates is employed, intolerable delay times result.

To understand more clearly the effects of the aforementioned delay, consider a long binary counter such as a 14-bit counter. The time required for this counter to prepare itself for a change from all "1's" to all "0's" when counting up (or the opposite when counting down) is proportional to the number of bits in the counter when the number of NOR gates used is minimized. This limitation must be applied to all succeeding flip-flops in the counter. For example, in the case of the flip-flop corresponding to the third least significant digit in the aforementioned 14-bit counter, the load under these circumstances in addition to loading external to the counter will be the inputs to the succeeding 11 flip-flops. The location of regeneration elements such as NOR gates in series with the third least significant flip-flop output introduces a time delay in the arrival of the carry signal at the most significant digit flip-flop input. Hence, as the counter is made longer, the number of series regeneration elements increases thus further increasing the time delay. The significance of the delay is that the clock pulse spacing can be no closer than the switching time of a flip-flop in the least significant digit position plus the total delay time for that output to reach and "set up" the flip-flop corresponding to the most significant digit. If, for example, standard NOR gates and general purpose flip-flops are used to mechanize the aforementioned counter, the logic designer is faced with two problems; first, the minimization of the total number of NOR gates used and, secondly, the minimization of total signal propagation time between flip-flops corresponding to the least significant digit and the most significant digit.

It is therefore and object of the present invention to provide an improved digital computer counting apparatus.

Another object of the present invention is to provide a long "count-up, count-down" counter having a minimum total number of gates.

Still another object of the present invention is to provide a digital computer counting apparatus incorporating carry propagation gates which substantially reduce the delay between flip-flops corresponding to the least significant digit and the most significant digit over that obtainable with conventional gating methods.

A further object of the present invention is to provide an improved carry propagation gate for use in digital computing apparatus.

In the following description, the binary counter of the present invention is considered as being a one-bit-time, parallel, add-one binary adder. In accordance with the invention, however, the adder incorporates an improved carry propagation gate between every flip-flop constituting the storage register of the counter. Each of the aforementioned carry propagation gates perform logic defined as follows:

$$\bar{C}_N = \bar{C}_{N-1} + \overline{(Q_{N-1}\cdot U)}\cdot\overline{(\bar{Q}_{N-1}\cdot D)} \quad (1)$$

$$= \bar{C}_{N-1} + \left[\overline{(\overline{\bar{Q}_{N-1}+\bar{U}}) + (\overline{Q_{N-1}+\bar{D}})}\right] \quad (2)$$

wherein a bar over a quantity designates the negation or complement of that quantity, and the (+) and the (·) indicate the Boolean logic OR and AND functions, respectively. In particular, $C_N$ designates the carry digit from the $(N-1)$th digit of the binary number; U designates the signal for counting "up"; D designates the signal for counting "down"; and $Q_N$ and $\bar{Q}_N$ designate the principal and complementary outputs, respectively, of the flip-flop corresponding to the Nth digit of the binary number stored in the counter. Relations (1) and (2) designate that the output, $\bar{C}_N$, of a particular carry propagation gate is the same as the input carry signal, $\bar{C}_{N-1}$, provided that $(Q_{N-1}\cdot U)$ or $(\bar{Q}_{N-1}\cdot D)$ are at the information level. It is thus apparent that the binary counter of the present invention is of a type wherein the rate at which a carry signal is propagated along the length of the register is not dependent upon successive changes in the state of successive flip-flops but rather upon the rate at which the successive carry propagation gates are capable of changing state.

In the device of the present invention, all flip-flops that are going to change state in response to a particular pulse to be counted make this change simultaneously in response to a clock pulse, which can be the pulse being counted. Accordingly, the worst case for time delay occurs when the outputs of the flip-flop corresponding to the least significant digit must travel the electrical length of the counter to the inputs of the flip-flop corresponding the most significant digit, and in so doing "set up" all the flip-flops in the counter so that they will each change state at the next clock time. During the bit interval immediately prior to the clock time when the principal output from all the flip-flops will change from the information level to the zero level in the count-up procedure, $(Q_{N-1}\cdot U)$ is in each case at the information level with the exception of $(Q_1\cdot U)$, which quantity changes from the zero level to the information level during this interval, and, in so doing, initiates a carry signal propagation which "sets up" the remaining flip-flops. It is apparent from relation (1) that the output of each carry propagation gate will be the same as the output of the preceding carry propagation gate, and that no other flip-flop need change state during this interval. The respective carry propagation gates need only "sense" the state of the corresponding flip-flops and transpose the carry signal from the inputs to the outputs thereof with minimum delay. In particular, the carry propagation gates of the present invention incorporate emitter-follower type circuitry that is adapted to transpose and regenerate carry signals without inversion at extremely fast rates compared with conventional techniques, thereby making possible the implementation of long digital binary counters with a minimum of both gating and delay simultaneously.

Figure 2:
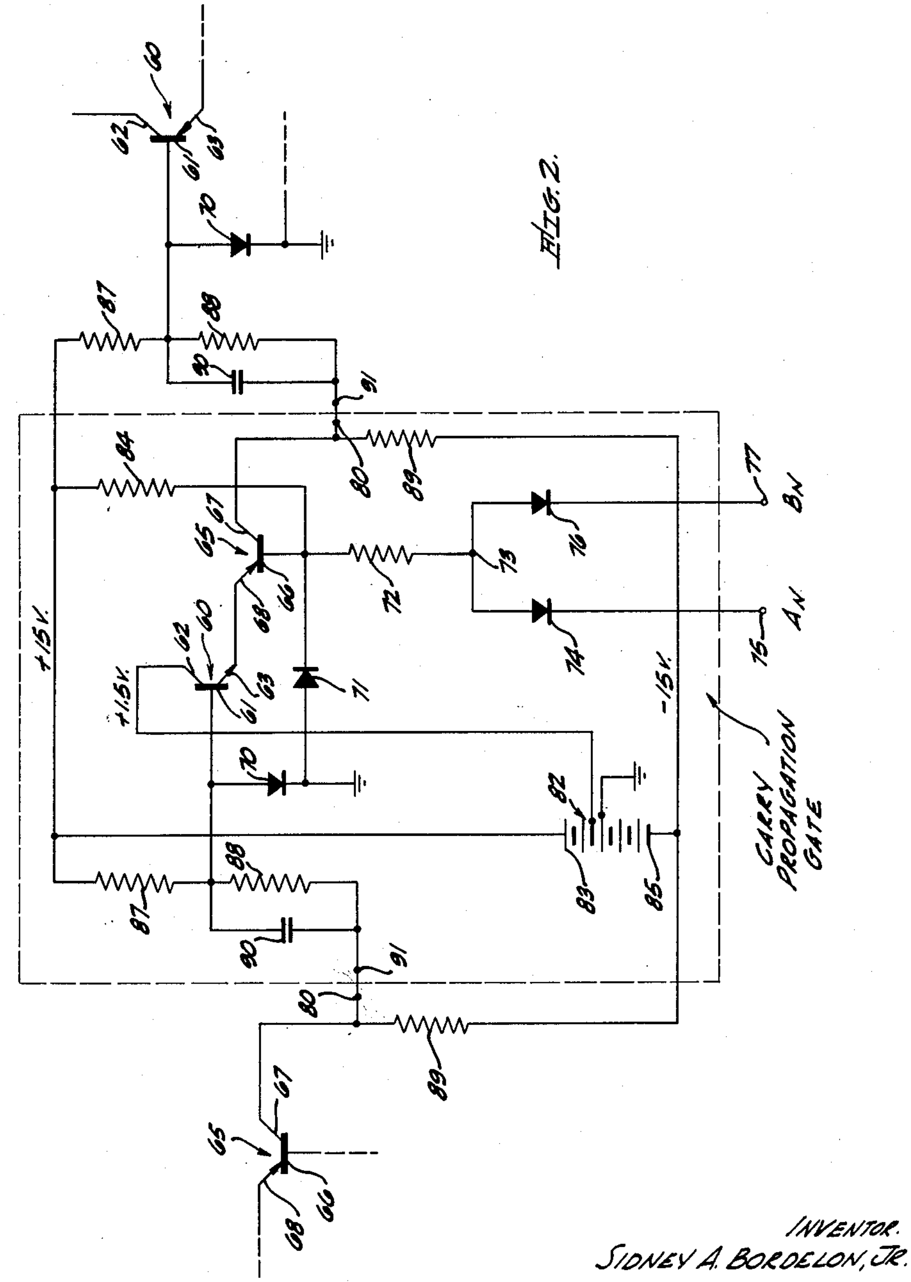

The above-mentioned and other features and objects of this invention and the manner of obtaining them will become more apparent by reference to the following description taken in conjunction with the accompanying drawings, wherein:

FIG. 1 is a schematic block diagram of a binary counter in accordance with the present invention; and FIG. 2 illustrates a schematic circuit diagram of one of the carry propagation gates in the apparatus of FIG. 1.

In describing the apparatus of the present invention, a convention is employed wherein individual AND gates are shown as semicircular blocks with the inputs applied to the straight side and the output appearing on the semi-circular side. An AND gate is indicated by a dot (·) in the semi-circular block. As is generally known, an AND gate produces a "one" or information level output signal only when every input is at the information level; i.e., the output signal is the "conjunction" of the input signals.

In addition to the above, a convention is employed wherein individual NOR gates are shown as isosceles trapezoids with the inputs applied to the longer side, and the output appearing on the shorter side. A NOR gate is indicated by a (·) disposed within the isosceles trapezoidal blocks. As is generally known, a NOR gate produces a signal representative of the conjunction of the negations or complements of the respective input signals or, expressed differently, the negation or complement of the alternations of the input signals.

A further convention is employed in describing the particular embodiments of the present invention wherein leads to the upper and lower portion of the left side of the respective rectangles representing flip-flops, as they appear in the drawings, are designated as the set and reset inputs, respectively. Further, the principal and complementary output terminals from the flip-flop emanate from the upper and lower portion of the right side of the rectangle, respectively. An information level signal applied to either the set or reset input of a flip-flop will result in a possible change of state thereof at the next clock time if a zero level signal is applied to the remaining input, whereby an information level signal appears at the corresponding principal or complementary output terminal. Lastly, it is considered within the present state of the computer art that flip-flops may be employed which possess an AND gate at its set and reset inputs, which AND gate is an integral part of its circuit.

Referring now more particularly to FIG. 1, a preferred embodiment of the digital computer counting apparatus of the present invention is comprised of a plurality of flip-flops or counter stages 11, 12, 13, 14 and 15, corresponding, respectively, to stages $FF_1$, $FF_2$, $FF_3$, $FF_{M-1}$ and $FF_M$, wherein M is the total number of stages in the register of the counter. The total number of flip-flops to be employed will be determined by the number of signal pulses to be counted. Each of the flip-flops 11 through 15 possesses a set input designated by S, and a reset input designated by R. Also, the flip-flops 11 through 15 each generate two stable states which are evidenced by complementary voltage waveforms which appear at the principal and complementary outputs and are designated as $Q_N$ and $\overline{Q}_N$, respectively, N being any of the flip-flops from 1 to M. In order for the flip-flops to change state, an information level signal is applied at either of the set or reset inputs and a zero level signal is applied to the remaining input. In the event an information level signal is applied to the set input, the flip-flop will assume or maintain the state wherein an information level signal is generated at the principal output commencing with the next succeeding clock time. On the other hand, if an information level signal is applied to the reset input, the flip-flop will assume or maintain the state wherein an information level signal is generated at the complementary output commencing with the next succeeding clock time.

A succession of pulse type input signals to be counted is provided by a pulse source 10. These pulse type input signals are applied through input terminal 16 to an input of a two-input AND gate 18 along with clock pulse signals applied over a lead 19 from a clock pulse generator 20. The output of the AND gate 18 is applied in parallel to the clock pulse input of each of the flip-flops 11 through 15. The clock pulses thus applied to each of the flip-flops 11 through 15 are ANDed with the signals appearing at the set and reset inputs. Hence, if no information level signals appears on the set or reset inputs, the flip-flop will not change state; if an information level signal is applied to the set input, the flip-flop will assume or maintain the state wherein an information level signal is generated on the principal output at the next clock time; and if an information level signal is applied to the reset input, the flip-flop will assume or maintain the state wherein an information level signal is generated on the complementary output thereof. The principal outputs of the flip-flops 11 through 15 are connected to output terminals 22, 23, 24, 25 and 26, respectively, to provide a parallel output from the disclosed counter. The set input of the flip-flop 11 is connected to the output of a single input NOR gate 27, and the reset input connected to the output of a similar single input NOR gate 28. In addition, the principal output of flip-flop 11 is connected to the input of NOR gate 27, and the complementary output thereof is connected to the input of the NOR gate 28. In that the NOR gates 27 and 28 have only a single input, it is evident that they function as inverters. Thus, in effect, the complementary output waveform $\overline{Q}_1$ is aplied to the set input, and the principal output waveform $Q_1$ is applied to the reset input of flip-flop 11. This being the case, it is apparent that flip-flop 11 will change state in response to every clock pulse generated at the output of AND gate 18.

The set input of flip-flop 12 is connected to the output of a two-input NOR gate 30, and the reset input is connected to the output of a two-input NOR gate 31. In a manner similar to the flip-flop 11, the principal output of flip-flop 12 is connected to an input of the NOR gate 30, and the complementary output of flip-flop 12 is connected to an input of the NOR gate 31. The remaining inputs of the NOR gates 30 and 31 both receive a carry signal in a manner hereinafter described. Similarly, the set inputs of flip-flops 13, 14 and 15 are connected to the respective outputs of two-input NOR gates 33, 34 and 35, respectively, and the reset inputs connected to the outputs of two-input NOR gates 36, 37 and 38, respectively. The principal outputs of flip-flops 13, 14 and 15 are applied, respectively, to an input of the NOR gates 33, 34, and 35, and the complementary outputs thereof to an input of the NOR gates 36, 37 and 38.

The remaining inputs of the NOR gates 30, 31; 33, 36; 34, 37; and 35, 38 receive carry signals from carry propagation gates 39, 40, 41 and 42, respectively.

Each of the carry propagation gates 39, 40, 41 and 42 generate the logical output:

$$\overline{C}_N=\overline{C}_{N-1}+\overline{[A_N+B_N]} \qquad (3)$$

in response to $A_N$, $B_N$ and $\overline{C}_{N-1}$ inputs. In the aforementioned relationship (3), N assumes successive values from 2 to M, and $\overline{C}_1$ is defined as always being equal to zero. That is, $C_1$ is always equal to unity so as to increase or decrease the count stored in the flip-flops by one at every clock time. A more detailed description of the operation of carry propagation gates 39, 40, 41 and 42 is presented in connection with the description of FIG. 2 of the drawings. The respective outputs of two-input NOR gates 44, 45, 46 and 47 are applied to the $A_N$ inputs of carry propagation gates 39, 40, 41 and 42, respectively, and the respective outputs of two-input NOR gates 48, 49, 50 and 51 are applied to the $B_N$ inputs of carry propagation gates 39, 40, 41 and 42, respectively. In accordance with the aforementioned definition, $\overline{C}_1$ always equals zero whereby a zero level signal is applied to the $\overline{C}_{N-1}$ input of carry propagation gate 39 by means of a connection therefrom to ground over a lead 53. The output of carry propagation gate 39 is then applied in parallel to the inputs of NOR gates 30 and 31 as well as to the $\overline{C}_2$ input of carry propagation gate 40. Likewise, the output of carry propagation gate 40 is applied to the inputs of NOR gates 33 and 36 as well as to the $\overline{C}_{M-2}$ input of carry propagation gate 41. The output of carry propagation gate 41 is, in turn, applied to inputs of NOR gates 34 and 37 as well as to the $\overline{C}_{M-1}$ input of carry propagation gate 42. Lastly, the output of carry propagation gate 42 which constitutes the carry signal $\overline{C}_M$ is applied to inputs of NOR gates 35 and 38.

An "up-down" flip-flop 54 is provided for controlling whether the disclosed counting apparatus counts up or down. Accordingly, the principal and complementary output signals generated by flip-flop 54 are designated U and D, respectively. In that the signals U and D are always complementary, the signal U may also be designated as $\overline{D}$ and the signal D as $\overline{U}$. The signal $\overline{U}$ available at the complementary output of flip-flop 54 is applied to an input of each of the NOR gates 44, 45, 46 and 47, and the signal $\overline{D}$ available at the principal output of flip-flop 54 is applied to an input of each of the NOR gates 48, 49, 50 and 51. In addition, the signals $Q_1$ through $Q_{M-1}$ available at the principal outputs of flip-flops 11 through 14 are applied, respectively, to the remaining inputs of NOR gates 48 through 51 and the signals $\overline{Q}_1$ through $\overline{Q}_{M-1}$ available at the complementary outputs of flip-flops 11 through 14 are applied to the remaining inputs of NOR gates 44 through 47, respectively.

The operation of the apparatus of FIG. 1 can best be demonstrated by showing that the logic of the signals appearing at the respective S and R inputs of the flip-flops 11 through 15 is conventional. As is evident from FIG. 1 of the drawings, $$A_N = Q_{N-1} \cdot U \qquad (4)$$

$$B_N = \overline{Q}_{N-1} \cdot D \qquad (5)$$

Thus, from relation (3)

$$\overline{C}_N = \overline{C}_{N-1} + \left[\overline{(Q_{N-1} \cdot U) + (\overline{Q}_{N-1} \cdot D)}\right] \qquad (6)$$

$$C_N = \left[\overline{\overline{C}_{N-1} + \overline{Q_{N-1} \cdot U + \overline{Q}_{N-1} \cdot D}}\right] \qquad (7)$$

$$= C_{N-1} \cdot (Q_{N-1} \cdot U + \overline{Q}_{N-1} \cdot D) \qquad (8)$$

Also, the signals $\overline{C}_N$ and $Q_N$ are applied through the respective NOR gates to $S_N$ of $FF_N$ and the signals $\overline{C}_N$ and $\overline{Q}_N$ are applied through the respective NOR gates to $R_N$ of $FF_N$ whereby $$S_N = \overline{C}_N + Q_N = C_N \cdot \overline{Q}_N \qquad (9)$$

$$R_N = \overline{C}_N + \overline{Q}_N = C_N \cdot Q_N \qquad (10)$$

Substituting relation (8) in relations (9) and (10)

$$S_N = (C_{N-1} \cdot \overline{Q}_N \cdot Q_{N-1} \cdot U) + (C_{N-1} \cdot \overline{Q}_N \cdot \overline{Q}_{N-1} \cdot D) \qquad (11)$$

$$R_N = (C_{N-1} \cdot Q_N \cdot Q_{N-1} \cdot U) + (C_{N-1} \cdot Q_N \cdot \overline{Q}_{N-1} \cdot D) \qquad (12)$$

As previously specified, N commences at 2 and $C_1$ is defined as always being equal to unity. Thus for N less than or equal to M, relations (11) and (12) become:

$$S_N = \overline{Q}_N \cdot (Q_{N-1} \ldots Q_3 \cdot Q_2 \cdot Q_1 \cdot U) + \overline{Q}_N \cdot (\overline{Q}_{N-1} \ldots \overline{Q}_3 \cdot \overline{Q}_2 \cdot \overline{Q}_1 \cdot D) \qquad (13)$$

$$R_N = Q_N \cdot (Q_{N-1} \ldots Q_3 \cdot Q_2 \cdot Q_1 \cdot D) + \overline{Q}_N \cdot (\overline{Q}_{N-1} \ldots \overline{Q}_3 \cdot \overline{Q}_2 \cdot \overline{Q}_1 \cdot D) \qquad (14)$$

Inspection of the relations (13) and (14) reveals that the counting apparatus of the present invention will count clock pulses generated at the output of AND gate 18 up or down dependent upon which of the complementary control signals U or D is at the information level.

Referring now to FIG. 2 of the drawings, there is shown a schematic circuit diagram of the carry propagation gates 39, 40, 41 or 42. Each of the carry propagation gates 39, 40, 41 or 42 are comprised of an n-p-n type transistor 60, having a base 61, a collector 62 and an emitter 63, and a p-n-p type transistor 65 having a base 66, a collector 67 and an emitter 68, the emitter 68 of transistor 65 being connected directly to the emitter 63 of transistor 60. The base 61 of transistor 60 is connected through a high conductance type germanium diode 70 to ground, which diode 70 is poled to allow current to flow towards ground. In addition, base 66 of transistor 65 is connected through a "quick recovery" type silicon diode 71 to ground, diode 71 being poled to allow current flow away from ground. The base 66 of transistor 65 is further connected through a resistor 72 to a junction 73 which, in turn, is connected through a diode 74 to an input terminal 75, previously designated the "$A_N$" input, and through a diode 76 to an input terminal 77, previously designated as the "$B_N$" input. The diodes 74 and 76 are both poled to allow current to flow away from the junction 73. The collector 67 of transistor 65, on the other hand, is connected to an output terminal 80 which, in turn, is connected to the inputs of NOR gates 30, 31; 33, 36; 34, 37; or 35, 38, which amounts to a load impedance of the order of 5000 ohms.

Voltage for the transistors 60 and 65 is provided, by way of example, by a battery 82 having an intermediate terminal thereof connected to ground, an intermediate positive terminal capable of developing of the order of +1.5 volts relative to ground connected to the collector 62 of transistor 60 and a positive terminal 83 capable of developing +15 volts relative to ground connected through a resistor 84 to the base 66 of transistor 65. In addition to the foregoing, battery 82 has a negative terminal 85 capable of developing −15 volts relative to ground. An input terminal 91 of carry propagation gates 40, 41 and 42 is connected to the output terminal 80 of the preceding carry propagation gates 39, 40 and 41, respectively, and the input terminal 91 of carry propagation gate 39 is connected to ground. Serially connected resistors 87 and 88 are connected in the order named from the positive terminal 83 to the input terminal 91 which, in turn, is connected to the preceding output terminal 80 which is returned through a resistor 89 to the negative terminal 85 of battery 82, whereby resistors 87, 88 and 89 constitute a resistor-dividing network across the battery 82. Resistor 88 of this network is shunted by a capacitor 90, and the junction between resistors 87 and 88 is connected to the base 61 of transistor 60.

During the operation of the disclosed apparatus of the present invention, a zero level signal is defined as ground or zero volt, and an information level signal is defined as a negative potential of the order of −6 volts relative to ground. The logical requirement of the carry propagation gates 39, 40, 41 or 42 as specified in relation (3) may be expressed as follows:

$$\overline{C}_N = \overline{C}_{N-1} + \overline{A}_N \cdot \overline{B}_N \qquad (15)$$

The apparatus of FIG. 2 must perform the logic of relation (15) for all combinations of $\overline{C}_{N-1}$, $\overline{A}_N$, and $\overline{B}_N$ which are considered in the following cases I, II and III.

*Case I.*—Assume $A_N=B_N=O$ whereby $\overline{A}_N$ and $\overline{B}_N$ are both at information level. With these inputs, the logic of relation (15) dictates that $\overline{C}_N$ must be at information level irrespective of whether $\overline{C}_{N-1}$ is at zero or information level. Referring now to FIG. 2, the germanium diode 70 prevents the resistor-dividing network formed by resistors 87, 88 and 89 from raising the potential applied to base 61 of transistor 60 to more than +0.4 volt with respect to ground. Next, the input terminals 75 and 77 are both maintained at zero volt, i.e., $A_N=B_N=O$, whereby resistors 84 and 72, and diodes 74 and 76 form a potential dividing network with the result being that a potential more positive than +0.5 volt relative to ground is applied to the base 66 of transistor 65, thus back-biasing the diode 71. Since the base 66 of transistor 65 is now more positive than the base 61 of transistor 60, current flow through both of the transistors 60 and 65 is cut off. Under the foregoing circumstance, it is immaterial whether or not the base 61 is more negative than the +0.4 volt; hence, both possibilities for $\overline{C}_{N-1}$, i.e., zero volt or −6 volts at input terminal 91, are covered. With current flow cut off, the output terminal 80 is pulled negative by reduced current flow to the negative terminal 85 of battery 82 through resistor 89, thereby generating an information level output signal.

*Case II.*—Assume that $A_N$ or $B_N$ or both are at the information level, whereby $\overline{A}_N \cdot \overline{B}_N$ of relation (15) is at zero level, and $\overline{C}_{N-1}$ is at the information level. Under these circumstances, $\overline{C}_N$ must equal $\overline{C}_{N-1}$ which is at the information level. Referring to FIG. 2, the application of an information level signal to either input terminal 75 or 77 results in back-biasing the opposite diode 76 or 74, respectively, whereby resistors 84 and 72 form a resistor-dividing network from the +15 volts available at the positive terminal 83 of battery 82 to the potential of the information level signal $A_N$ or $B_N$ which is −6 volts relative to ground. This action, however, is limited at the base 66 of transistor 65 by the silicon diode 71, which prevents the base from going more negative than −0.8 volt relative to ground. On the other hand, with an information level input, i.e., −6 volts, at input terminal 91, the base 61 of transistor 60 is maintained at a potential of the order of −1.6 volts relative to ground, which is negative relative to the potential of base 66, thereby cutting off current flow through both transistors 60 and 65. Consequently, the output termial 80 is maintained at information level (−6 volts) by reduced current flow through resistor 89 to the negative terminal 85 of battery 82 in the same manner as in case I. It is to be noted that the output terminal 80 is at the information level which is the same as that of the applied signal, $\overline{C}_{N-1}$.

*Case III.*—Assume that $A_N$ or $B_N$ or obth are at the information level, whereby $\overline{A}_N \cdot \overline{B}_N$ of relation (15) is at zero level, and $\overline{C}_{N-1}$ is at zero level. As before $\overline{C}_N$ must equal $\overline{C}_{N-1}$, but, unlike before, $\overline{C}_{N-1}$ is now at zero level. Also, as in case II, the application of an information level signal to either input terminal 75 or 77 results in back-biasing the opposite diode 76 or 74, respectively, whereby resistors 84 and 72 form a resistor-dividing network from the +15 volts available at the positive terminal 83 of battery 82 to the potential of the information level signal $A_N$ or $B_N$ which is −6 volts relative to ground. Unlike case II, however, the zero level signal applied to input terminal 91 results in a potential of +0.4 volt relative to ground at the base 61 of transistor 60, thus making the potential of base 61 positive relative to that of base 66, whereby transistors 60 and 65 both conduct. The increased current due to this conduction tends to increase the potential level at base 66. This effect, together with the clamping effect of diode 71, results in a potential of −0.4 volt relative to ground at the base 66 of transistor 65, which is still negative relative to the potential of base 61 of transistor 60. The resistances of the resistors 87, 88 and 89 are selected so that under these circumstances the voltage developed at output terminal 80 is −0.05 volt relative to ground which is considered zero level by definition and which is the same level as that of the applied signal, $\overline{C}_{N-1}$.

The function of capacitor 90 is to provide transient "base overdrive" current to transistor 60, thus increasing the speed of the emitter follower action which this transistor provides. Also, the turn-off transition of transistor 60 is quickened considerably by returning the collector 62 to the arbitrary, small positive voltage of the order of +1.5 volts. Thus, transistor 60 which generally need not be an exceptionally high frequency transistor will not saturate, whereby the effective frequency response is increased. Since transistor 65, on the other hand, must go into saturation, it is desirable to employ a high frequency transistor for this component. Examples of parameter values for the elements of carry propagation gates 39, 40, 41 or 42 which may be employed to achieve the results described above are as follows:

| | |
|---|---|
| Transistor **60** | 2N388 |
| Transistor **65** | 2N1500 |
| Diode **70** | HD2552 |
| Diode **71** | 1N626 |
| Diodes **74**, **76** | HD6379 |
| Resistor **72** ohms | 4,640 |
| Resistor **84** do | 31,600 |
| Resistor **87** do | 38,300 |
| Resistor **88** do | 8,250 |
| Resistor **89** do | 4,220 |
| Capacitor **90** micromicrofarads | 220 |

The above values of resistance are based upon an additional load impedance of the order of 5000 ohms being connected between the output terminal 80 and ground potential. In the apparatus of FIG. 1, this additional load impedance has the form of the parallel NOR gates 30, 31; 33, 36; 34, 37; or 35, 38. With the above-identified components and parameter values; it was determined that a "0" or "1" propagated through 11 carry propagation gates of the present invention in less than 0.6 microsecond, and the delay between the $A_N$ or $B_N$ inputs and the $\overline{C}_N$ output of the same switch is less than 0.4 microseconds.

Although the invention has been shown in connection with a certain specific embodiment, it will be readily apparent to those skilled in the art that various changes in form and arrangement of parts may be made to suit requirements without departing from the spirit and scope of the invention.

What is claimed is:

A digital computer apparatus comprising means including a plurality of bistable elements for providing storage for a binary number, each of said bistable elements having a set and a reset input for controlling the level of the potential developed at principal and complementary outputs, respectively; means for developing complementary bi-level signals U and D for controlling whether said apparatus counts up or down, respectively, in response to pulse signals to be counted; carry propagation means interconnected between each successive pair of said bistable elements, thereby forming a sequence of said carry propagation means for producing successive signals representative of the logic $$\overline{C}_{N+1}=\overline{C}_N+\overline{(\overline{Q}_N+\overline{U})+(Q_N+\overline{D})}$$

wherein N is a positive integer which assumes successive values commencing from no less than one, $\overline{C}_N$ and $\overline{C}_{N+1}$ are the negations of the carry signals, which negations thereof are developed by the $(N-1)$st and the Nth carry propagation means, respectively, of said sequence thereof, $\overline{C}_1$ of which is defined as always being at zero level, and $Q_N$ and $\overline{Q}_N$ are the principal and complementary output signals, respectively, developed by the Nth bistable element corresponding to the Nth digit of said binary number; and a gating means corresponding to each respective bistable element, each gating means being responsive directly to pulse signals to be counted, to voltages available at principal and complementary outputs of the respective corresponding bistable element, and to respective carry signals for controlling the application of information level signals to respective set and reset inputs of said bistable elements thereby to change the value of said binary number by one upon the occurrence of each of said pulse signals to be counted.

References Cited in the file of this patent

UNITED STATES PATENTS

| | | |
|---|---|---|
| 2,735,005 | Steele | Feb. 14, 1956 |
| 2,764,343 | Diener | Sept. 26, 1956 |
| 2,819,840 | Huntley et al. | Jan. 14, 1958 |
| 2,844,317 | Shillington | July 22, 1958 |
| 2,848,166 | Wagner | Aug. 19, 1958 |
| 2,941,721 | Schart et al. | June 21, 1960 |
| 2,953,695 | Rywak | Sept. 20, 1960 |
| 2,986,655 | Wiseman et al. | May 30, 1961 |
| 3,022,945 | Carroll et al. | Feb. 27, 1962 |
| 3,023,371 | Balish et al. | Feb 27, 1962 |
| 3,051,848 | Clark | Aug. 28, 1962 |
| 3,059,226 | Einsele | Oct. 16, 1962 |

OTHER REFERENCES

"A Formal Procedure for the Logical Design of an Optimum Binary Counter," by Cohen, from "Proc. of the Natl. Electronics Conference," 1954, pp. 523–532.

UNITED STATES PATENT OFFICE
CERTIFICATE OF CORRECTION

Patent No. 3,121,787 February 18, 1964

Sidney A. Bordelon, Jr.

It is hereby certified that error appears in the above numbered patent requiring correction and that the said Letters Patent should read as corrected below.

Column 5, lines 66 and 67, the relations should appear as shown below instead of as in the patent:

$$S_N = \overline{\bar{C}_N + Q_N} = C_N \cdot \bar{Q}_N \qquad (9)$$

$$R_N = \overline{\bar{C}_N + \bar{Q}_N} = C_N \cdot Q_N \qquad (10)$$

column 6, lines 6 and 7, the upper portion of relation "(14)" should appear as shown below instead of as in the patent:

$$R_N = Q_N \cdot (Q_{N-1} \cdots Q_3 \cdot Q_2 \cdot Q_1 \cdot U)$$

column 7, line 49, for "termial" read -- terminal --; line 55, for "obth" read -- both --.

Signed and sealed this 21st day of July 1964.

(SEAL)
Attest:

ESTON G. JOHNSON EDWARD J. BRENNER

Attesting Officer Commissioner of Patents